(12) United States Patent
Thomassey et al.

(10) Patent No.: US 8,393,866 B2
(45) Date of Patent: Mar. 12, 2013

(54) DRIVE DEVICE FOR DRIVING FIRST AND SECOND LIFT ROTORS OF A ROTORCRAFT HAVING TWIN ROTORS IN TANDEM

(75) Inventors: Lionel Thomassey, Fos sur Mer (FR); Eric Magre, Pelissanne (FR)

(73) Assignee: Eurocopter, Marignane Cedex (FR)

( * ) Notice: Subject to any disclaimer, the term of this patent is extended or adjusted under 35 U.S.C. 154(b) by 827 days.

(21) Appl. No.: 12/574,173

(22) Filed: Oct. 6, 2009

(65) Prior Publication Data

US 2010/0086404 A1    Apr. 8, 2010

(30) Foreign Application Priority Data

Oct. 7, 2008 (FR) ...................................... 08 05517

(51) Int. Cl.
  *B64C 11/50*   (2006.01)
  *B64C 27/14*   (2006.01)
  *B64C 27/08*   (2006.01)

(52) U.S. Cl. ....... 416/34; 416/128; 416/170 R; 416/172; 244/17.23

(58) Field of Classification Search ............... 415/122.1; 416/124, 170 R, 33, 120, 34; 244/17.23, 244/60
See application file for complete search history.

(56) References Cited

U.S. PATENT DOCUMENTS 3,115,936 A * 12/1963 Blews, Jr. ..................... 416/120
3,963,372 A *  6/1976 McLain et al. ................. 416/30
4,976,669 A    12/1990 Jones
6,065,718 A *  5/2000 Piasecki ..................... 244/17.11
6,364,249 B1   4/2002 Morgan et al.
2002/0104922 A1 8/2002 Nakamura

FOREIGN PATENT DOCUMENTS

FR    1 419 069    11/1965
FR    2 644 134    9/1990
GB    889.024      2/1962

OTHER PUBLICATIONS

French Search Report dated Jun. 3, 2009, from corresponding French application.

* cited by examiner

*Primary Examiner* — Edward Look
*Assistant Examiner* — William Grigos
(74) *Attorney, Agent, or Firm* — Brooks Kushman P.C.

(57) ABSTRACT

A drive device (D) for driving first and second lift rotors (2, 3) of a twin-rotor rotorcraft, includes link elements provided with first and second transmission shafts (5, 6) for synchronizing the first and second transmission members (74, 84) of first and second main gearboxes (7, 8), the first main gearbox (7) being provided with first power combiner element (73) firstly meshing with the first transmission member (74) and secondly mechanically linked with the first transmission shaft (5) and with the second transmission shaft (6), and the second main gearbox (8) being provided with second power combiner element (83) firstly meshing with the second transmission member (84), and secondly mechanically linked with the first transmission shaft (5) and with the second transmission shaft (6).

15 Claims, 3 Drawing Sheets

DRIVE DEVICE FOR DRIVING FIRST AND SECOND LIFT ROTORS OF A ROTORCRAFT HAVING TWIN ROTORS IN TANDEM

FIELD OF THE INVENTION

The present invention relates to a drive device for driving first and second lift rotors of a rotorcraft having twin rotors in tandem.

BACKGROUND OF THE INVENTION

An aircraft may be fitted with two lift rotors that provide it both with lift and with propulsion. In a rotorcraft, these two rotors may be arranged one behind the other along the longitudinal axis of said rotorcraft: this is referred to as a rotorcraft having twin rotors in tandem. Conventionally, each rotor of a twin-rotor rotorcraft is driven by a respective main gearbox (MGB). The main gearboxes, driven by an appropriate power plant, serve to reduce the speed of rotation between a power source and a rotor by a ratio of the order of 10 to 100.

Each rotor comprises a plurality of blades secured to a hub and enabling the rotorcraft to be provided with lift and propulsion. Nevertheless, while it is rotating, a rotor driven by a gearbox subjects the rotorcraft to a high level of torque in yaw. In a single-rotor rotorcraft, this torque is generally opposed by an anti-torque rotor arranged at the rear end of the tail boom.

In a rotorcraft having twin rotors in tandem, the first and second lift rotors are generally contrarotating so that the yaw torque generated in one direction by the first rotor is either greatly reduced or else completely cancelled by the yaw torque generated in the opposite direction by the second rotor. The combined effect of the yaw torque from both rotors thus enables the rotorcraft to be stabilized relative to its yaw axis while flying in a straight line, without wind.

During rotation of each of the rotors of a rotorcraft having twin rotors in tandem, the rotor blades perform circular motion describing respective surfaces that are referred to as "rotor disks". If the rotors are not spaced far enough apart from each other, then the blades of the first rotor might collide with the blades of the second rotor, thereby causing them to be destroyed, and consequently causing the rotorcraft to be destroyed.

It would therefore appear to be logical to space the first rotor apart from the second rotor. Nevertheless, in practice, it is very difficult to keep the rotors far enough apart to avoid any incident.

To do that, it would be necessary to increase the size of the rotorcraft fuselage, thereby making the rotorcraft heavier. Consequently, in order to compensate for the increase in the weight of the rotorcraft, it would be appropriate to install a power plant of greater power and to increase the surface area of the blades of each rotor in order to increase their lift.

If it is found to be impossible to space the rotors apart from each other, it is possible to envisage offsetting the first rotor vertically relative to the second rotor. It should be observed that the first and second rotors are generally vertically offset relative to each other for aerodynamic reasons. Nevertheless, since the rotor disks can be inclined in order to maneuver the rotorcraft, it is practically impossible to offset the first and second rotors far enough apart vertically to avoid any risk of interference between their blades.

Conventionally, in a rotorcraft having twin rotors in tandem, the rotors are not far enough apart either longitudinally or vertically to ensure that there is no interference between the rotor disks, unless special precautions are taken. Consequently, the first and second main gearboxes are interconnected by mechanical link means that enable the speeds of rotation of the rotors to be synchronized so as to guarantee that the blades do not strike one another. The blades are then said to be "meshing" since the rotating blades of the first rotor present a constant phase shift in azimuth relative to the rotating blades of the second rotor.

Below, the term "drive system" is used to designate all of the rotary parts situated between the power plant and the blades of the first and second rotors.

Under such conditions and for rotors having synchronized speeds of rotation, various solutions are known for providing the link between the first and second main gearboxes of a rotorcraft having twin rotors in tandem.

A first solution is implemented in document US 2002/104 922 on a rotorcraft that has four rotors. A transmission shaft having first and second ends along its longitudinal axis is driven by an engine. The first and second ends of the transmission shaft drive simultaneously and respectively the first and second main gearboxes, each main gearbox simultaneously driving two rotors.

That first solution enables a very good mechanical synchronization to be achieved between the rotors, such that the blades of each rotor cannot come into collision. Nevertheless, should the transmission shaft break, then at least one rotor would no longer be driven, and that would lead to an accident for the rotorcraft. Furthermore, if the engine is stopped, the drive system is no longer driven, and that also can lead to an accident for the rotorcraft.

A second solution is described in document U.S. Pat. No. 6,065,718 that describes a rotorcraft having first and second mechanical assemblies. The first and second mechanical assemblies comprise respective first and second engines driving first and second rotors via first and second transmission members. The two transmission members are connected together by a transmission shaft serving to synchronize the first and second rotors. That second solution thus enables the rotors to be synchronized, so there is no risk of the blades striking one another. Nevertheless, the above-mentioned drawbacks would seem to persist with that second solution.

In spite of the above-mentioned drawbacks, the use of a single transmission shaft does not make it possible to comply with the certification objectives that are required by the organizations that issue airworthiness certificates for civil aircraft. That observation explains in part why known twin-rotor rotorcraft are military rotorcraft, since they are not subjected to civil standards that are strict in terms of safety.

A third solution described in detail in document U.S. Pat. No. 4,976,669 involves a rotorcraft having two rotors driven by an engine by means of a set of gears instead of a transmission shaft. While not only synchronizing the rotors so as to ensure that the blades do not touch one another, the gears improve the reliability with which power is transmitted. However, the gears need to be fed with a large amount of lubricant, such as oil, in order to ensure that they operate without jamming. Furthermore, since the distance between the first and second rotors can be large, that third solution requires a large number of gears, which can be very penalizing in terms of the weight and the reliability of the rotorcraft, given the large number of components.

Furthermore, in order to optimize the safety of such a transmission, it is of interest to stiffen the drive system. Specifically, document U.S. Pat. No. 6,364,249 B1 describes an arrangement for a power plant relative to a transmission member of a rotorcraft, the power plant and the transmission being incorporated within a protective casing of the transmission member. The assembly comprising the power plant and the transmission member thus benefits from the stiffness of the casing of the transmission member.

OBJECT AND SUMMARY OF THE INVENTION

The present invention seeks to remedy the drawbacks relating to the first three above-mentioned solutions, while guaranteeing safety, reliability of operation, and performance for a rotorcraft having twin rotors, so as to enable it to be certified for civil use.

To this end, the invention relates to a drive device for driving first and second lift rotors of a twin-rotor rotorcraft, said device being provided with first and second main gearboxes respectively provided with first and second transmission members suitable for setting said first and second rotors into rotation, said drive device including at least one engine for driving said first and second transmission members.

The invention is remarkable in that the drive device includes link means provided with first and second transmission shafts for synchronizing said first and second transmission members, said first main gearbox being provided with first power combiner means firstly meshing with said first transmission member and secondly mechanically linked with said first transmission shaft and with said second transmission shaft, and said second main gearbox being provided with second power combiner means firstly meshing with said second transmission member and secondly mechanically linked with said first transmission shaft and with said second transmission shaft.

Consequently, the first transmission shaft is linked via its first and second ends respectively with the first and second power combiner means.

Likewise, the second transmission shaft is linked via its first and second ends respectively with the first and second power combiner means.

Thus, the first and second power combiner means are synchronized via the first and second transmission shafts. Naturally, the same applies to the first and second transmission members, and thus to the first and second rotors.

The invention thus goes against existing prejudices, whereby the rotors of a twin-rotor rotorcraft can be synchronized by means of a single shaft only.

On the contrary, the invention presents a novel solution enabling two transmission shafts to be used in such a manner as to comply with certification requirements, in particular requirements in terms of safety, with it being no longer catastrophic if one of the transmission shafts breaks.

Contrary to what might have been thought, implementing first and second transmission shafts does not lead to an unacceptable increase in weight nor does it use up an unreasonable amount of space, and furthermore it does not lead to significant disturbances, since the first and second transmission shafts do not give rise to harmful vibration, for example.

As explained below, the invention makes it possible to use transmission shafts of small dimensions, which shafts are better optimized as a function of the number and the positions of the engines, than are the single transmission shafts suggested in the state of the art, thereby making it possible in particular to optimize the weight and the size of the first and second transmission shafts.

Furthermore, the drive device includes one or more of the following additional characteristics.

Advantageously, at least one transmission shaft comprises a plurality of segments.

Thus, it is easier to adapt to the configuration of the rotorcraft, it being possible, for example, for each transmission shaft to comprise two segments that are not in alignment, presenting an angle between each other, and that are mechanically linked together by conventional means.

For example, if the transmission shaft is a shaft of the supercritical type, it may comprise two or three segments, each provided with a respective damper.

In contrast, it is possible to provide a larger number of segments when using a shaft of the subcritical type.

In addition, if a transmission shaft should break while it is being driven in rotation by the power combiner means, there is a risk of it damaging the surrounding elements.

Thus, in a first embodiment, the drive means include retaining means for retaining at least one transmission shaft.

For example, the retaining means may comprise a plurality of bearings distributed along the first transmission shaft. Likewise, other retaining means may possess bearings for a holding the second transmission shaft in position.

In a second embodiment, the drive device includes at least one emergency decoupling system, which system is advantageously reversible, each emergency decoupling system being provided with a mechanical assembly arranged between one end of a transmission shaft and the associated power combiner means to mechanically link said transmission shaft to said power combiner means in a coupled-together mode of operation.

It should be observed that the drive device is in a coupled-together mode of operation when the parts of the device are functionally in good condition.

Optionally, the drive device has four emergency decoupling systems arranged respectively:

between a first end of a first transmission shaft and the first power combiner means;

between a second end of the first transmission shaft and the second combiner means;

between a first end of the second transmission shaft and the first power combiner means; and between a second end of the second transmission shaft and the second power combiner means.

Thus, should the first transmission shaft, or one of its segments where appropriate, become split into two portions, then the emergency decoupling system can decouple the first transmission shaft from the first and/or second power combiner means so that said portions are no longer driven in rotation. The same applies for the second transmission shaft.

Each mechanical assembly is then optionally provided with a reversible shape-interference coupling and with a link shaft.

Consequently, the emergency decoupling system may include control means and detector means, such as a vibration sensor, for detecting breakage of a transmission shaft, the control means serving, in the event of said transmission shaft breaking, to order the mechanical assembly, e.g. via its shape-interference coupling, to cease mechanically linking the transmission shaft with power combiner means.

It should be observed that the first and second embodiments can be combined.

Furthermore, in order to drive the first and second rotors, it is possible to provide one or more of the following characteristics:

at least one engine drives said mechanical assembly of an emergency decoupling system in rotation, thereby setting into motion the power combiner means with which said mechanical assembly are mechanically linked;

at least one engine drives power combiner means in rotation, thereby setting into motion said first and second transmission shafts; and at least one engine drives a transmission shaft in rotation, thereby setting into motion said first and second power combiner means.

In addition, for at least one first engine and at least one second engine driving said first and second transmission members, said first engine sets into motion said first transmission member by directly driving a first mechanical element comprising either a mechanical assembly of an emergency decoupling system arranged at a first end of a transmission shaft, or said first power combiner means, or else said first transmission shaft, said second engine setting into motion said second transmission member by directly driving a second mechanical element comprising either a mechanical assembly of an emergency decoupling system arranged at a second end of a transmission shaft, or said second power combiner means, or else said second transmission shaft.

Furthermore, at least one engine driving said first and second transmission members via a respective mechanical element comprising a mechanical assembly of an emergency decoupling system, power combiner means, or a transmission shaft, a step-down gear provided with a freewheel is arranged between said engine and said mechanical element.

Thus, in a first variant, it is possible, for example, to envisage a first engine driving a first step-down gear linked to a first power combiner means and a second engine driving a second step-down gear linked to a second power combiner means.

In a second variant, a first engine drives the first end of the first transmission shaft engaged with the first power combiner means, while a second engine drives the first end of the second transmission shaft engaged with the first power combiner means.

In a third variant, for each transmission shaft comprising in succession a first end, in middle zone, and then a second end, a first engine drives a first step-down gear engaged with the middle zone of the first shaft, and a second engine drives a second step-down gear engaged with the middle zone of the second shaft.

It should readily be understood that the above combinations are not limiting, it being possible in particular for the second and third variants to be combined.

For at least one first engine and at least one second engine driving said first and second transmission members, said first engine sets into motion said first transmission member by driving a first mechanical element comprising either a mechanical assembly of an emergency decoupling system arranged at a first end of a transmission shaft, or said first power combiner means, or else said first transmission shaft, via a first step-down gear, said second engine setting into motion said second transmission member by driving a second mechanical element comprising either a mechanical assembly of an emergency decoupling system arranged at a second end of a transmission shaft, or said second power combiner means, or else said second transmission shaft, via a second step-down gear.

According to an additional technical characteristic, each main gearbox includes a casing surrounding its transmission member and its power combiner means in order to stiffen them.

Furthermore, since the prior transmission member of a main gearbox is driven by an engine via a step-down gear provided with a freewheel, the step-down gear is advantageously arranged inside the casing of the main gearbox, with the engine then being fastened to said casing in order to optimize the stiffness of the assembly.

BRIEF DESCRIPTION OF THE DRAWINGS

The invention and its advantages appear in greater detail in the context of the following description of preferred embodiments given without any limiting character and with reference to the accompanying figures, in which.

MORE DETAILED DESCRIPTION

Figure 1:
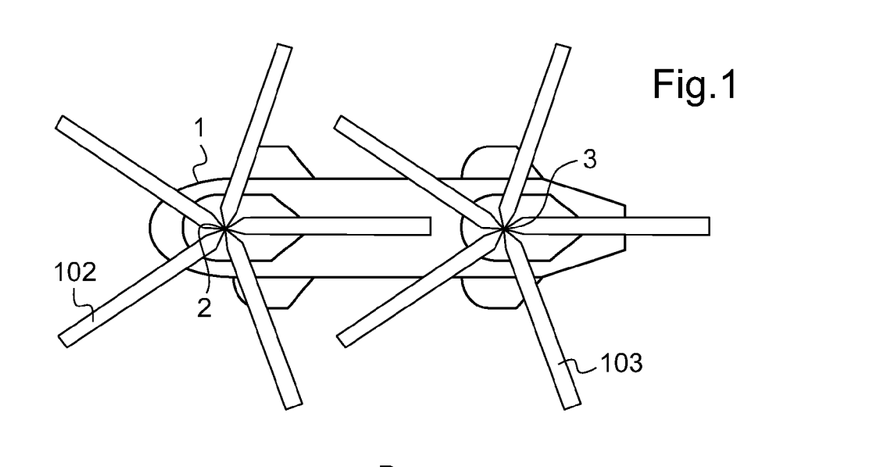
FIG. 1 is a plan view of a rotorcraft having twin rotors in tandem, for explaining the problem.

FIG. 1 shows a twin-rotor rotorcraft 1, more precisely a helicopter having twin rotors in tandem. To provide it with lift and propulsion, the rotorcraft 1 with twin rotors in tandem has a first rotor 2 and a second rotor 3. The first rotor 2 and the second rotor 3 are contrarotating and have the same number of blades 102 and 103. The blades 102 of the first rotor 2 and the blades 103 of the second rotor 3 need to be "meshing" in order to avoid striking one another in flight. Consequently, the first rotor 2 and the second rotor 3 need to be synchronous so as to rotate at the same speed of rotation. It should readily be understood that a speed difference between these first and second rotors would lead to direct contact between the blades 102 and 103 of the first and second rotors 2 and 3.

Figure 2:
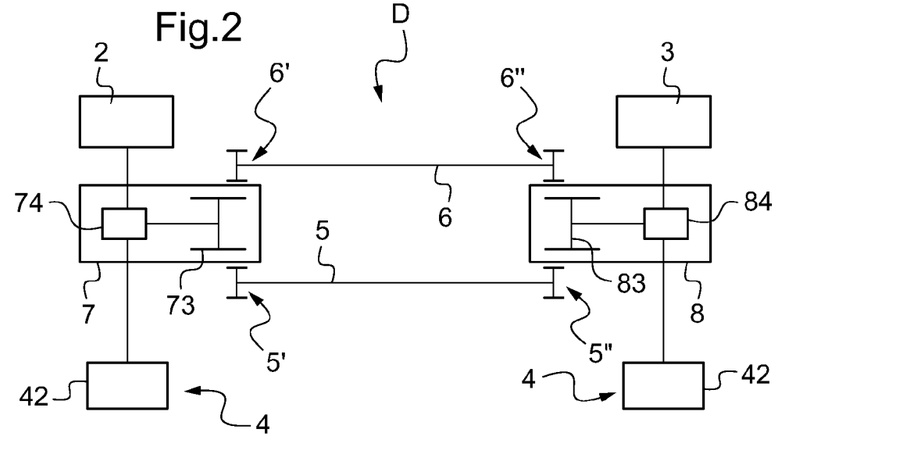
FIG. 2 is a diagram showing the principle of operation of the drive device of the invention.

FIG. 2 thus shows the elements of a drive device D for driving the first and second rotors 2 and 3 of the rotorcraft 1. A power plant 4, provided with first and second engines 41 and 42, drives a first main gearbox 7 and a second main gearbox 8, the first and second main gearboxes 7 and 8 respectively driving the first rotor 2 and the second rotor 3.

Furthermore, a first transmission shaft 5 and a second transmission shaft 6 are disposed in parallel between the first main gearbox 7 and a second main gearbox 8, in order to synchronize rotation of the first and second rotors 2 and 3 in such a manner that the blades 102 and 103 present a constant phase offset regardless of their azimuth angles. Because of the connection constituted in particular by the first and second transmission shafts 5 and 6, the first and second gearboxes 7 and 8 both rotate at the same speed of rotation. Likewise, the first and second rotors 2 and 3 both rotate at the same speed of rotation.

The first and second main gearboxes 7 and 8 have respective first and second power combiner means 73 and 83 for summing the powers developed by the first and second transmission shafts 5 and 6. By way of example, it is assumed that the first power combiner means 73 and the second power combiner means 83 comprise respective gearwheels meshing simultaneously with the first transmission shaft 5 and with the second transmission shaft 6.

Thus, the first end 5' of the first transmission shaft 5 and the first end 6' of the second transmission shaft 6 mesh with the first power combiner means 73, whereas the second end 5" of the first transmission shaft 5 and the second end 6" of the second transmission shaft 6 mesh with the second power combiner means 83.

The presence of the first and second transmission shafts 5 and 6 connected in parallel makes it possible for the first and second rotors 2 and 3 to continue to be synchronized in rotation in the event of one or other of the transmission shafts 5 or 6 breaking. The remaining transmission shaft can act on its own to synchronize the first and second rotors 2 and 3.

Contrary to what might be thought, the presence of two transmission shafts 5 and 6 does not involve an increase in weight, since the first and second transmission shafts 5 and 6 may be under-dimension in so far as they are redundant.

Nevertheless, if, by way of example, the first transmission shaft 5 should break, then the various pieces that result from such breaking might damage the device, or indeed jam it.

Figure 3:
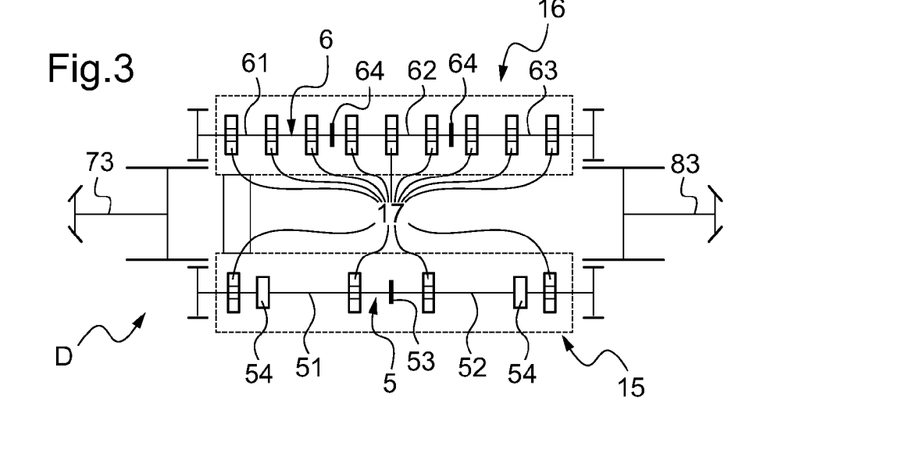
FIG. 3 is a diagram of a first embodiment of the invention.

Consequently, with reference to FIG. 3, and in a first embodiment, the drive device D has first and second retaining means 15 and 16 respectively for retaining the first and second transmission shafts 5 and 6.

Each of the first and second retaining means 15 and 16 comprises a plurality of bearings 17. Since the bearings are distributed longitudinally along each of the first and second transmission shafts 5 and 6, these bearings are in a position to guide the first and second transmission shafts 5 and 6 in rotation, even in the event of failure, so as to contain said shafts within a predefined volume.

It should be observed that FIG. 3 shows a first transmission shaft 5 of the supercritical type.

This supercritical first transmission shaft 5 comprises two segments 51 and 52 that are connected together by conventional means 53.

Each segment of the first transmission shaft 5 is then provided with two bearings 17 and with a damper 54.

In contrast, the second transmission shaft 6 is of the subcritical type. This subcritical second transmission shaft 6 comprises three segments 61, 62, and 63 interconnected by conventional means 64. Each segment of the second transmission shaft 6 is thus provided with three bearings 17.

Naturally, FIG. 3 is given by way of illustration. Instead of implementing transmission shafts of different types, it may be preferred to use two shafts of identical type, i.e. two shafts that are supercritical or two shafts that are subcritical.

Figure 4:
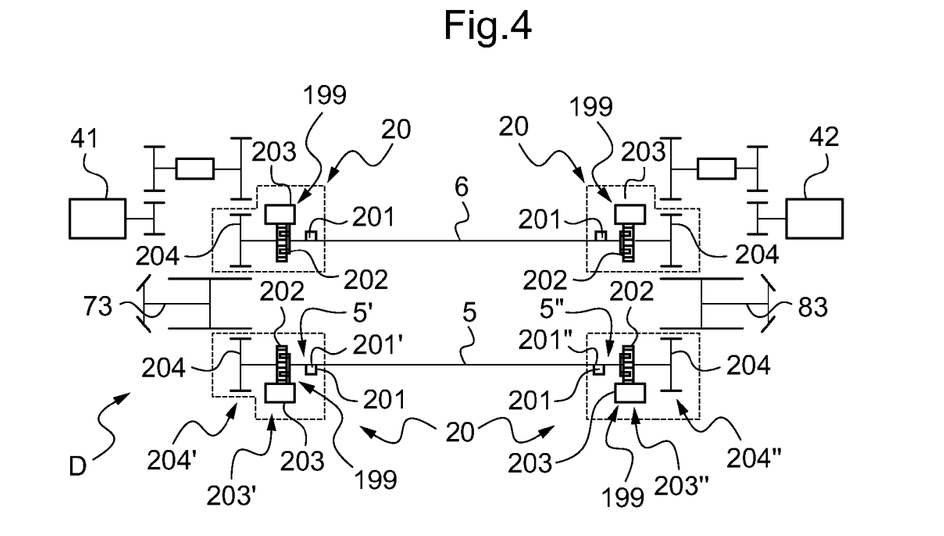
FIG. 4 is a diagram of a second embodiment of the invention.

With reference to FIG. 4, in a second embodiment, at least one emergency decoupling system 20 is implemented.

Thus, a respective emergency decoupling system 20 is arranged between each transmission shaft 5 or 6 and each of the power combiner means 73 and 83. In the event of one of the transmission shafts failing, each emergency decoupling system 20 enables the failed transmission shaft to be disconnected from one of the power combiner means 73 and 83.

Each emergency decoupling system 20 then comprises a mechanical assembly 199 provided with break detector means 201 for detecting breakage of the associated transmission shaft, with a shape-interference coupling 202, with control means 203, and with a link shaft 204.

In the event of one of the transmission shafts breaking, the transmission shaft will flap and generate undue vibration. The detector means 201 detects this vibration and sends a signal to the control means 203 that order the shape-interference coupling 202 to separate the failed transmission shaft from the link shaft 204 meshing with the associated power combiner means.

For example, when the detector means 201' and 201'' of the first transmission shaft 5 detect undue vibration, the control means 203' and 203'' associated with said first transmission shaft 5 order disconnection of the link shafts 204' and 204'' that were previously connected to the first and second ends 5' and 5'' of the first transmission shaft 5.

The failed transmission shaft 5 is then no longer driven either by the first power combiner means 73 or by the second power combiner means 83. Thus, there is no risk of the failed shaft interfering with the proper operation of the rotorcraft 1.

Optionally, it is possible to make provision for subsequent flight, with a single transmission shaft interconnecting the first and second power combiner means, to take place under restricted, limp-home flying conditions.

If it turns out that the transmission shaft 5 is not, in fact, broken, then it is possible, preferably from the ground, to order the shape-interference coupling 202 to reconnect the transmission shaft 5 that was thought to have failed with the link shaft 204.

Figure 5:
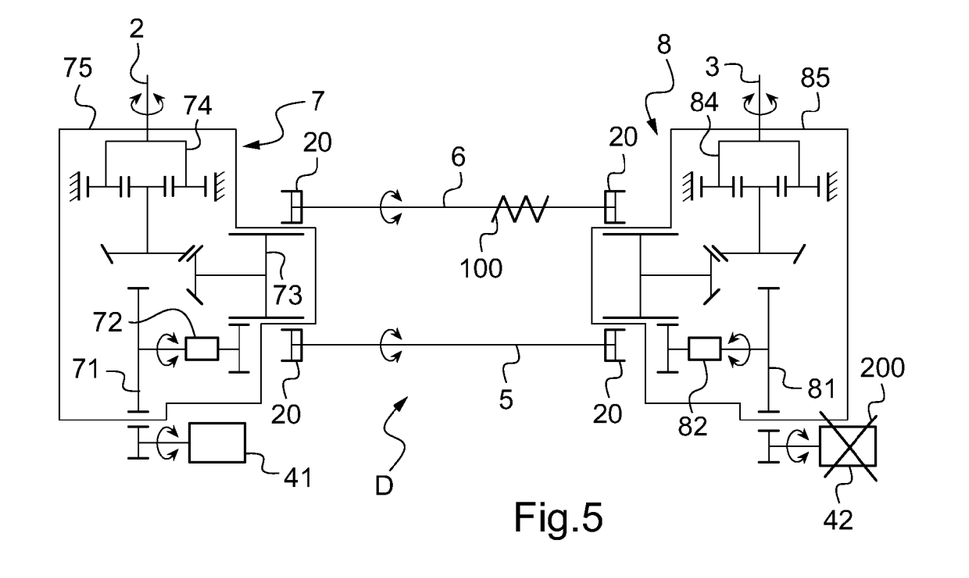
FIG. 5 is a diagram of a first variant of a drive device.

FIG. 5 shows a first variant of the drive device D of the invention. The first main gearbox 7 comprises a first step-down gear 71, first power combiner means 73, and a first transmission member 74, the first step-down gear 71 including a first overrun clutch or freewheel 72.

Likewise, the second main gearbox 8 comprises a second step-down gear 81, second power combiner means 83, and a second transmission member 84, the second step-down gear 81 including a second freewheel 82.

In this first variant, the drive device D is provided with a first engine 41 that meshes with the first step-down gear 71 with first torque C1. The first step-down gear 71 meshes with the first power combiner means 73, which in turn meshes with the first transmission member 74. The first transmission member 74 thus drives the first rotor 2, said rotor 2 having blades 102 that serve to support and propel the rotorcraft 1.

The first power combiner means 73 also mesh with the first and second transmission shafts 5 and 6.

In parallel, the drive device D is provided with a second engine 42 that meshes with the second step-down gear 81 with second torque C2. The second step-down gear 81 meshes with the second power combiner means 83, which in turn meshes with the second transmission member 84. The second transmission member 84 thus drives the second rotor 3, said rotor 3 having blades 103 that serve to provide the rotorcraft 1 with lift, and also with propulsion.

The second power combiner means 83 also mesh with the first and second transmission shafts 5 and 6, thereby enabling the first and second power combiner means 73 and 83 to be mechanically interconnected so that the blades 102 of the first rotor 2 and the blades 103 of the second rotor 3 continue mesh in azimuth so as to be synchronized in rotation.

In this first variant, the first transmission shaft 5 and the second transmission shaft 6 are parallel, and each of them is subjected to torque having a first value $$\frac{\Delta C}{2},$$

where $\Delta C$ represents the difference in torque between the first torque C1 from the first engine 41, and the second torque C2 from the second engine 42. This gives:

$$|\Delta C|=|C1-C2|.$$

It should be observed that the torque difference $\Delta C$ varies as a function of the attitude of the rotorcraft.

The first engine 41 and the second engine 42 have similar power levels, so the first value $$\frac{\Delta C}{2}$$

is very small, or even zero. In the first variant, the first transmission shaft 5 and the second transmission shaft 6 are therefore practically unloaded when functionally coupled together, i.e. so long as neither transmission shaft has failed and neither engine has failed.

The first and second transmission shafts 5 and 6 may thus present minimal weight, there being no need for these transmission shafts to be overdimensioned.

Furthermore, the first main gearbox 7 and the second main gearbox 8 arranged respectively in a first protective casing 75 and in a second protective casing 85. The first engine 41 and the second engine 42 are then connected respectively to the first protective casing 75 and to the second protective casing 85.

The first protective casing 75 is very stiff. Arranging the first main gearbox 7 inside the first protective casing 75 and fastening the first engine 41 to the first protective casing 75 enables the assembly to benefit from the stiffness of the first protective casing 75, thereby obtaining an assembly that is particularly stiff.

Likewise, the second protective casing 85 is very stiff. Arranging the second main gearbox 8 inside the second protective casing 85 and fastening the second engine 42 to the second protective casing 85 enables the assembly to benefit from the stiffness of the second protective casing 85 so as to obtain an assembly that is particularly stiff.

In addition, it should be observed that it is advantageous to fit the drive device D with a plurality of engines. Thus, if one engine suffers a breakdown 200, it should be possible to disconnect it from the drive system, so that jamming of the second engine 42 does not lead to the first and second rotors being jammed.

To do this, a first freewheel 72 and a second freewheel 82 are arranged respectively on the first step-down gear 71 and on the second step-down gear 81. The first freewheel 72 and the second freewheel 82 serve respectively to enable the first engine 41 or the second engine 42 to be disconnected from the remainder of the drive system. More precisely, the engine that is no longer capable of delivering sufficient driving torque for driving the first rotor 2 and the second rotor 3 is disconnected.

This situation may occur in the event of an engine failing, or indeed stopping. Nevertheless, given that the first engine 41 and the second engine 42 cannot rotate at exactly the same speed, the first freewheel 72 and the second freewheel 82 allow the first rotor 2 and the second rotor 3 to rotate at the same speed, i.e. at the speed of rotation driven by the engine having the speed of rotation that is the greater.

For example, assuming that the first engine 41 is rotating faster than the second engine 42, the first engine 41 drives the first and second rotors 2 and 3, while the second freewheel 82 disconnects the second engine from the remainder of the device.

In the event of one of the engines suffering a breakdown 200, the remaining engine is capable on its own of driving the first and second rotors 2 and 3 via the first and second transmission shafts 5 and 6.

The remaining engine thus drives the main gearbox that is associated therewith together with the other main gearbox via the first and second transmission shafts 5 and 6.

Under such conditions, each of the first and second transmission shafts must be capable of withstanding a maximum level of torque that is equivalent to half of the torque delivered by the remaining engine under emergency conditions.

Furthermore, the drive device D of the invention includes a first transmission shaft 5 and a second transmission shaft 6 in such a manner that in the event of a transmission shaft 6 failing, e.g. breaking 100, the other transmission shaft 5 ensures synchronization of the rotation of the first rotor 2 and of the second rotor 3. However, by construction, the first transmission shaft 5 and the second transmission shaft 6 have a speed of rotation that is generally high because of the need for the installation to be light in weight and for operation to be efficient, and they benefit from technical progress.

Nevertheless, in principle, such systems rotating at high speed are sensitive specifically to un-balance effects, a conventional source of vibration. Thus, the distribution of the mass of the rotary parts about the axis of rotation can give rise to inertia effects. These inertia effects then give rise to vibration in the support structure or to cyclical forces in the links that cause the component elements of rotary systems to break.

Under such circumstances, the center of inertia is no longer on the axis of rotation, which itself is no longer on the main inertia axis.

Naturally, when the masses of the rotary elements are regularly distributed around the axis of rotation, the resulting inertia effects cancel out: the elements is said to be balanced.

Otherwise, an unbalance appears that corresponds to superposing a "static" unbalance and a "dynamic" unbalance.

As a result, cracking or breaking of a transmission shaft can lead to severe structural damage that can cause other moving elements to become jammed. It is therefore desirable to avoid such damage.

When the detector means 201 detect an unbalance on one of the transmission shafts, they send a signal to the control means 203 that order the shape-interference coupling 202 to disconnect the transmission shaft that presents the unbalance. Said transmission shaft is therefore not driven either by the first power combiner means 73 or by the second power combine means 83. Thus, there is no risk of the failing shaft interfering with the proper operation of the rotorcraft 1.

The remaining shaft must act on its own to synchronize the first and second rotors 2 and 3 by transmitting a low level of torque.

By making use firstly of a first engine driving the first transmission member, itself acting directly or via a first stepdown gear, to drive a first mechanical element comprising a mechanical assembly of an emergency decoupler system arranged at a first end of a transmission shaft, or the first power combiner means, or indeed the first transmission shaft, and secondly of a second engine driving said second transmission member, itself acting directly or via a second stepdown gear to drive a second mechanical element comprising a mechanical assembly of an emergency decoupler system arranged at a second end of a transmission shaft, or said second power combiner means, or even said second transmission shaft, it is possible to minimize the torque that said first and second transmission shafts need to withstand, even in the event of one of the transmission shafts breaking or in the event of one of the engines failing.

Figure 6:
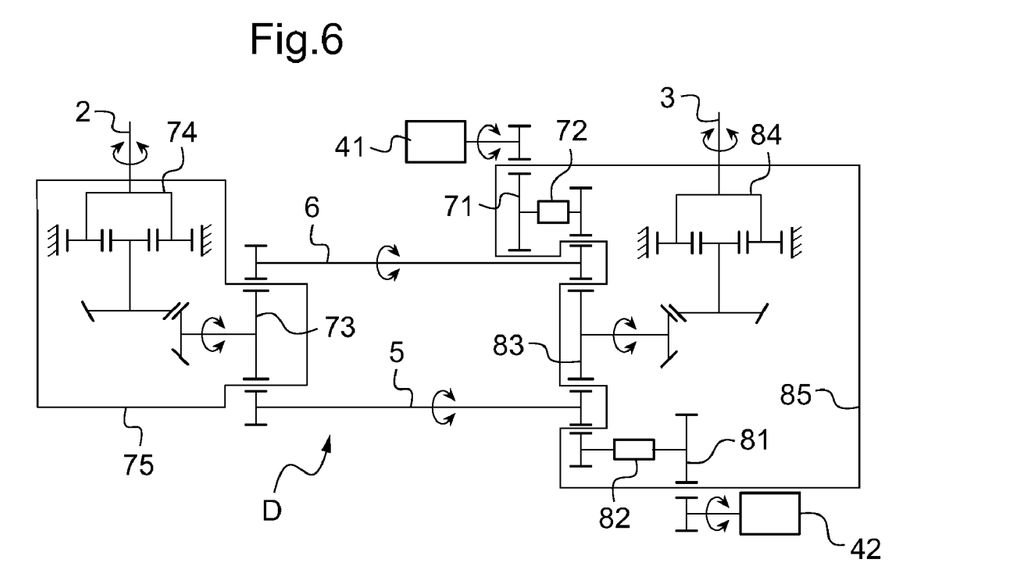
FIG. 6 is a diagram of a second variant of a drive device.

FIG. 6 shows a second variant of the drive device D. This second variant is similar to the first variant, but it presents a different arrangement of the first and second engines 41 and 42. In this second variant, the first engine 41 and the second engine 42 engage respectively with the second ends of the first and second transmission shafts 5 and 6, meshing with the second power combiner means 83.

In this second variant, the first casing 75 is arranged around the main gearbox 7 and the second casing 85 is arranged around the main gearbox 8. The second casing 85 further includes the first and second step-down gears 71 and 81. In order to stiffen all of the elements making up the drive device D, so as to benefit from the stiffness of the second casing 85, the first and second engines 41 and 42 are fastened to the second casing 85.

Figure 7:
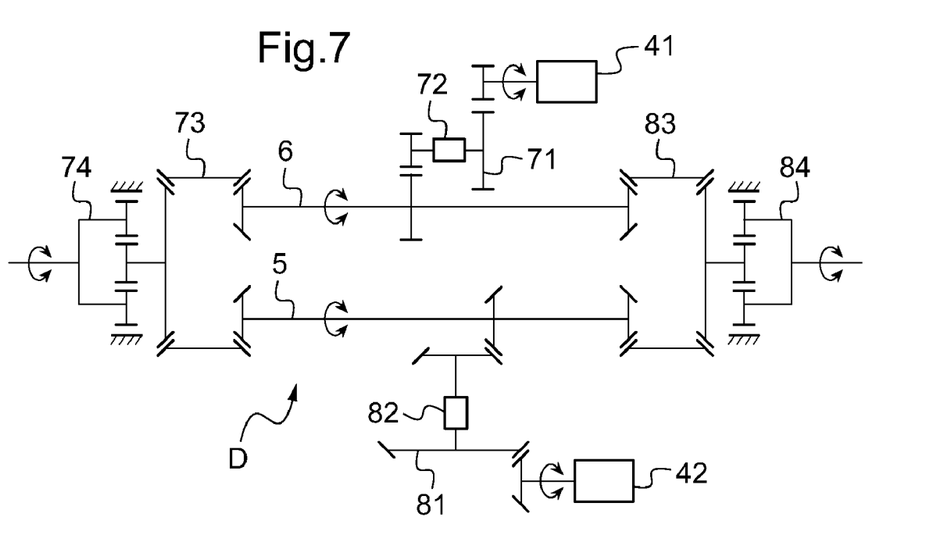
FIG. 7 is a diagram of a third variant of the drive device.

FIG. 7 shows a third variant of the drive device D. This third variant is similar to the first variant, but presents a different arrangement of the engines 41 and 42. In this third variant, the first engine 41 and of the second engine 42 drive respectively the first transmission shaft 5 and the second transmission shaft 6 via their middle zones 5''' and 6'''.

The first engine 41 meshes with the first step-down gear 71, which in turn drives the first transmission shaft 5 via its middle zone 5'''.

In parallel, the second engine 42 meshes with the second step-down gear 81, which in turn drives the second transmission shaft 6 via its middle zone 6'''.

The first and second transmission shafts together drive the first and second power combiner means 73 and 83. Said first and second power combiner means 73 and 83 respectively drive the first and second transmission members, in turn respectively driving the first and second rotors 2 and 3.

It should be observed that the first step-down gear has spur gearwheels, while the second step-down gear has conical gearwheels.

Nevertheless, wherever possible, gearwheels of the same type used both for the first and for the second step-down gears.

Naturally, the present invention may be subjected to numerous variations as to its implementation. Although several variants and embodiments are described above, it should readily be understood that it is not conceivable to identify exhaustively all possible variants and embodiments. It is naturally possible to envisage replacing any of the means described by equivalent means without thereby going beyond the ambit of the present invention.

In this respect, it is clear, for example, that certain variant embodiments may have some number of engines greater than two and may present specific positions regardless of their number.

Furthermore, the figures show a rotorcraft having first and second rotors that are contrarotating.

Nevertheless, these rotors could rotate in the same direction of rotation. Under such circumstances, the axes of rotation of the first and second rotors should present respective first and second angles relative to a vertical plane defined by the roll and yaw axes of the rotorcraft, the first and second angles having opposite values.

What is claimed is:

1. A drive device (D) for driving first and second lift rotors (2, 3) of a twin-rotor rotorcraft, said drive device (D) being provided with first and second main gearboxes (7, 8) respectively provided with first and second transmission members (74, 84) suitable for setting said first and second rotors (2, 3) into rotation, said drive device (D) including at least one engine (41, 42) for driving said first and second transmission members (74, 84), wherein the drive device includes link means provided with first and second transmission shafts (5, 6) for synchronizing said first and second transmission members (74, 84), said first main gearbox (7) being provided with first power combiner means (73) firstly meshing with said first transmission member (74) and secondly mechanically linked with said first transmission shaft (5) and with said second transmission shaft (6), and said second main gearbox (8) being provided with second power combiner means (83) firstly meshing with said second transmission member (84) and secondly mechanically linked with said first transmission shaft (5) and with said second transmission shaft (6).

2. A drive device (D) according to claim 1, wherein at least one of the transmission shafts (5, 6) comprises a plurality of segments.

3. A drive device (D) according to claim 1, including retaining means (15, 16) for retaining at least one transmission shaft (5, 6).

4. A drive device (D) according to claim 1, including at least one emergency decoupling system (20), each emergency decoupling system (20) being provided with a mechanical assembly (199) arranged between one end (5', 5'', 6', 6'') of a transmission shaft (5, 6) and the associated power combiner means (73, 83) for mechanically linking said transmission shaft (5, 6) with said power combiner means (73, 83) in a coupled-together mode of operation.

5. A drive device (D) according to claim 4, wherein said mechanical assembly (199) is provided with a shape-interference coupling (202) and with a link shaft (204).

6. A drive device (D) according to claim 4, wherein said emergency decoupling system (20) includes control means (203) and detector means (201) for detecting breaking of said transmission shaft (5, 6), said control means (203) ordering the mechanical assembly (199) to cease mechanically linking the transmission shaft with a combiner means in the event of such breakage.

7. A drive device (D) according to claim 6, wherein said detector means (201) are constituted by a vibration sensor.

8. A drive device (D) according to claim 1, wherein, said device including at least one emergency decoupling system (20) provided with a mechanical assembly (199) arranged between one end (5', 5'', 6', 6'') of a transmission shaft (5, 6) and the associated power combiner means (73, 83), at least one engine drives said mechanical assembly (199) in rotation, thereby setting into motion of the power combiner means with which said mechanical assembly (199) is mechanically linked.

9. A drive device (D) according to claim 1, wherein a least one engine drives in rotation power combiner means (73, 83) that in turn set into motion said first and second transmission shafts (5, 6).

10. A drive device (D) according to claim 1, wherein at least one engine drives a transmission shaft (5, 6) that sets into motion said first and second power combiner means.

11. A drive device (D) according to claim 8, wherein, for at least one first engine and at least one second engine driving said first and second transmission members (74, 84), said first engine sets into motion said first transmission member (74) by directly driving a first mechanical element comprising either a mechanical assembly (199) of an emergency decoupling system (20) arranged at a first end of a transmission shaft, or said first power combiner means (73), or else said first transmission shaft (5), said second engine setting into motion said second transmission member (84) by directly driving a second mechanical element comprising either a mechanical assembly (199) of an emergency decoupling system (20) arranged at a second end of a transmission shaft, or said second power combiner means (83), or else said second transmission shaft (6).

12. A drive device (D) according to claim 8, wherein, for at least one first engine and at least one second engine driving said first and second transmission members (74, 84), said first engine sets into motion said first transmission member (74) by driving a first mechanical element comprising either a mechanical assembly (199) of an emergency decoupling system (20) arranged at a first end of a transmission shaft, or said first power combiner means (73), or else said first transmission shaft (5), via a first step-down gear (71), said second engine setting into motion said second transmission member (84) by driving a second mechanical element comprising either a mechanical assembly (199) of an emergency decoupling system (20) arranged at a second end of a transmission shaft, or said second power combiner means (83), or else said second transmission shaft (6), via a second step-down gear (72).

13. A drive device (D) according to claim 1, wherein, for at least one engine driving said first and second transmission members (74, 84) via a mechanical element comprising a mechanical assembly (199) of an emergency decoupling system (20), or power combiner means (73, 83), or else a transmission shaft (5, 6), a step-down gear (71, 81) provided with a freewheel (72, 82) is arranged between said engine and said mechanical element.

14. A drive device (D) according to claim 1, wherein each main gearbox includes a casing surrounding the transmission member and the power combiner means of said main gearbox.

15. A drive device (D) according to claim 1, wherein, for said transmission member of a main gearbox being driven by an engine via a step-down gear divided with a freewheel, said step-down gear is arranged inside said casing, said engine being fastened to said casing.

* * * * *